United States Patent
Doerksen et al.

(10) Patent No.: US 9,623,453 B2
(45) Date of Patent: Apr. 18, 2017

(54) SYSTEMS AND METHODS FOR ON-LINE PIGGING AND SPALLING OF COKER FURNACE OUTLETS

(71) Applicant: Bechtel Hydrocarbon Technology Solutions, Inc., Houston, TX (US)

(72) Inventors: Brian Doerksen, Bartlesville, OK (US); John Ward, Katy, TX (US); Rick Heniford, Katy, TX (US); Scott Alexander, Billings, MT (US); Richard Von Brecht, Katy, TX (US); Jorge Gonzalez, League City, TX (US)

(73) Assignee: Bechtel Hydrocarbon Technology Solutions, Inc., Houston, TX (US)

( * ) Notice: Subject to any disclaimer, the term of this patent is extended or adjusted under 35 U.S.C. 154(b) by 0 days.

(21) Appl. No.: 14/442,713

(22) PCT Filed: Oct. 22, 2014

(86) PCT No.: PCT/US2014/061845
§ 371 (c)(1),
(2) Date: May 13, 2015

(87) PCT Pub. No.: WO2015/061504
PCT Pub. Date: Apr. 30, 2015

(65) Prior Publication Data
US 2016/0272894 A1  Sep. 22, 2016

Related U.S. Application Data

(60) Provisional application No. 61/894,087, filed on Oct. 22, 2013.

(51) Int. Cl.
*B08B 9/032* (2006.01)
*B08B 9/055* (2006.01)
(Continued)

(52) U.S. Cl.
CPC .......... *B08B 9/0328* (2013.01); *B08B 7/0071* (2013.01); *B08B 9/032* (2013.01);
(Continued)

(58) Field of Classification Search
CPC ....... C10B 25/10; C10B 33/006; C10B 33/12; C10B 43/06; C10B 55/00; C10G 9/16;
(Continued)

(56) References Cited

U.S. PATENT DOCUMENTS 3,641,190 A * 2/1972 Kivlen et al. .......... B01J 19/243
 134/2
5,976,352 A * 11/1999 Busson .................... C10G 9/16
 208/130

(Continued)

OTHER PUBLICATIONS

Shane Thomas, Notification of Transmittal of The International Search Report and The Written Opinion of the International Searching Authority, PCT Application No. PCT/US14/61845, Jan. 14, 2015, 12 pages, International Searching Authority, Alexandria, Virginia.

(Continued)

*Primary Examiner* — Saeed T Chaudhry
(74) *Attorney, Agent, or Firm* — Crain, Caton & James

(57) ABSTRACT

Systems and methods for safe on-line pigging decoking of a coker furnace tubes and which also permits on-line spalling operations.

14 Claims, 1 Drawing Sheet

(51) Int. Cl.
*B08B 7/00* (2006.01)
*C10B 43/06* (2006.01)
*C10G 9/16* (2006.01)
*C10G 75/00* (2006.01)
*C10B 33/00* (2006.01)
*C10B 55/00* (2006.01)

(52) U.S. Cl.
CPC ............ B08B 9/0325 (2013.01); B08B 9/055 (2013.01); B08B 9/0551 (2013.01); C10B 33/006 (2013.01); C10B 43/06 (2013.01); C10G 9/16 (2013.01); C10G 75/00 (2013.01); *C10B 55/00* (2013.01)

(58) Field of Classification Search
CPC .......... C10G 9/206; C10G 75/00; C28G 1/12; C28G 13/005; F28D 2021/0059; B08B 9/00; B08B 9/02; B08B 9/027; B08B 9/032; B08B 9/0325; B08B 9/0328; B08B 9/0551; B08B 7/0071; F28G 1/12; F28G 13/005

See application file for complete search history.

(56) References Cited

U.S. PATENT DOCUMENTS

| | | | |
|---|---|---|---|
| 6,170,493 B1 * | 1/2001 | Sivacoe | B08B 9/0553 134/22.1 |
| 2006/0076225 A1 | 4/2006 | Lah | |
| 2008/0234868 A1 | 9/2008 | Osborne | |
| 2012/0186781 A1 | 7/2012 | Dreyer et al. | |

OTHER PUBLICATIONS

Western Filter Co., Launching Procedures, Oct. 1, 2002, 2 pages, www.westernfilterco.com, Western Filter Co., United States.

* cited by examiner

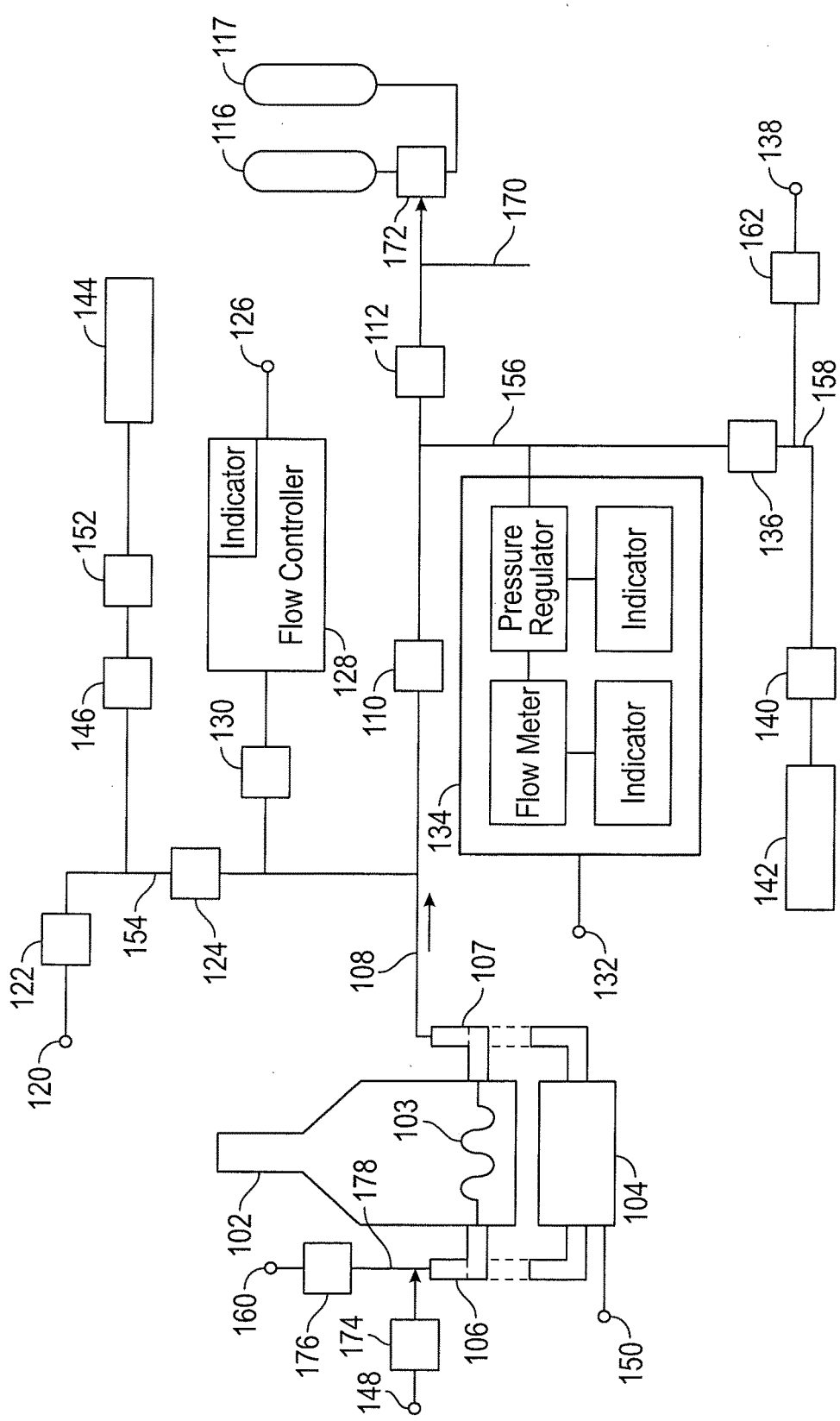

SYSTEMS AND METHODS FOR ON-LINE PIGGING AND SPALLING OF COKER FURNACE OUTLETS

CROSS-REFERENCE TO RELATED APPLICATIONS

This Application claims priority from PCT patent application Ser. No. PCT/US14/61845, filed on Oct. 22, 2014, which claims priority from U.S. Provisional Patent Application Ser. No. 61/894,087, filed on Oct. 22, 2013, which are incorporated herein by reference.

STATEMENT REGARDING FEDERALLY SPONSORED RESEARCH

Not applicable.

FIELD OF THE DISCLOSURE

The present disclosure generally relates to systems and methods for on-line pigging and spalling of coker furnace outlets. More particularly, the present disclosure relates to systems and methods which permit safe pigging of coker furnace tubes and which also permits on-line spalling operations.

BACKGROUND

Coker furnaces typically have four to six tube passes per pair of drums, often configured with two passes per furnace cell. It is not usual for one or more of these to "coke up"—to become constricted due to coke formation with the furnace cell—during use. Removal of this coke buildup is referred to as "decoking." Decoking may be necessary annually or more often, depending on various factors including design of the coking unit and the nature of the feed.

Historically, for decoking of a furnace cell, the associated (often two) delayed coking drums and the associated furnaces were fully shut down, after which the furnace cell was steam air decoked or offline decoked by mechanically removing the coke with scrapers driven through in the tubes by water (typically referred to as 'pigging decoking').

More recently, larger cokers have been built with two or more furnaces operating in parallel with multiple coke drums and with each furnace having multiple tube passes. Safe on-line pigging, that is, pigging decoking of a furnace cell while the associated delaying coking drums have continued to operate from input from other furnace cells, has not been available because, among other reasons, the piping system configuration must facilitate hazardous energy to be adequately contained in each step of operation.

A process referred to as "on-line spalling" has been used to decoke feed in a delayed coking system. In "on-line spalling," steam is used in typically two of the passes to displace the feed and subsequently to raise the tube metal temperature until the coke spalls off the tube. Decoking effluent is then escorted by the steam to mix with the process furnace effluent from other on-line passes and the combined stream flows to the coke drum. This beneficially permits decoking without shutting a unit down.

More particularly, on-line spalling occurs when steam is introduced through the two furnace coils displacing the process fluid. The steam flow, upon leaving the furnace, rejoins the process fluid furnace effluent from the passes which remain in service. Then, the temperature of the steam and the tube passes which are to be decoked are raised. This temperature increase continues until reaching a temperature far in excess of normal operations. This may be as high as 1250 F depending on the tube material, thickness. However, piping from furnace outlets typically predates the advent of on-line spalling. As a result, existing piping and valve systems lack sufficient robustness to permit the higher temperatures of on-line spalling. Attempts to on-line spall with this existing equipment may result in failure as the heated piping and components fail pressure containment. Alternatively, that piping may be unusable for generation of a useful pipe stress analysis to determine whether on-line spalling is possible. For example, use of conventional low alloy materials, such as 9Cr-1Mo, would result in operation in the material's creep range, together with the difficulty in pipe stress analysis. Thus, for on-line spalling, a higher alloy is typically required to meet regulatory requirements.

Additionally, on-line pigging decoking of these furnace tubes would provide benefits. While some feeds can be successfully on-line spalled several times in a row, because of inorganic deposition or similar reason, the tubes may not return fully to original start-of-run temperatures. Eventually, these coker furnaces need to be cleaned by mechanical scraper (pigging) decoking. As a result, the need has been recognized for both on-line spalling and on-line mechanical scraper cleaning. On-line pigging decoking presents operational and structural issues, such as safe transitioning among process steps and ensuring components can provide the safety factors needed for on-line pigging.

While both safe on-line pigging of the furnace and on-line spalling of the main line may be attractive to the operator of a delayed coking system, safe on-line pigging in conjunction with safe on-line spalling presents additional issues. In particular, the valves and lines used to provide a system for safe on-line pigging process, must also be able to sustain the temperatures and pressure line conditions of on-line spalling.

No piping configuration has been identified which permits safe hazardous energy isolation through all steps for on-line pigging. Nor has a piping configuration been identified which is competent to sustain the temperatures and pressure line conditions of on-line spalling.

SUMMARY OF THE DISCLOSURE

The present disclosure overcomes one or more deficiencies in the prior art by providing systems and methods which permit safe pigging of coker furnace tubes and which also permit on-line spalling operations.

In one embodiment, the present disclosure includes a method for on-line pigging in a tube coil for a furnace in a delayed coking system, which comprises: i) terminating a process fluid supply flow to the furnace; ii) introducing high pressurized steam from a first pressurized steam source through the tube coil and a main line, and from a second pressurized steam source through a second line connected to the main line for forcing any remaining process fluid in the tube coil and the main line to a closed blowdown system header or a delayed coking drum, the tube coil, the closed blowdown system header and the delayed coking drum in fluid communication with each other; iii) isolating a vent, in fluid communication with the second line, from the main line by introducing high pressurized steam from a third pressurized steam source through the second line to maintain a constant pressure against one side of first and second closed valves positioned in fluid communication with the vent between the vent and the main line while introducing the high pressurized steam from the first pressurized steam source and the second pressurized steam source; iv) terminating the introduction of the high pressurized steam from the first pressurized steam source, the second pressurized steam source and the third pressurized steam source; v) removing steam from the main line through the vent by opening the first and second closed valves between the vent and the main line; vi) isolating a drum input line, in fluid communication with the main line, from a portion of the main line by introducing high pressurized steam from a fourth pressurized steam source through a third line connected to the main line to maintain a constant pressure against one side of third, fourth and fifth valves in fluid communication with the drum input line, wherein two of the third, fourth and fifth valves are positioned on the main line between the drum input line and the portion of the main line, and one of the third, fourth and fifth closed valves is positioned on the third line between the main line and the closed blowdown system header; vii) disconnecting the tube coil from the main line and the first pressurized steam source; viii) connecting the tube coil to a pigging unit after the main line reaches atmospheric pressure; and ix) introducing water from a water source to the pigging unit for driving a pig through the tube coil.

In another embodiment, the present disclosure includes system for on-line pigging of a tube coil for a furnace being in a delayed coking system, which comprises: i) a first pressurized steam source in fluid communication with the tube coil at a tube coil first end; ii) a main line in fluid communication with the tube coil at a tube coil second end and in fluid communication with an additional drum input line, the main line having a first isolation valve between the tube coil second end and the additional drum input line, the main line having a second isolation valve between the first isolation valve and the additional drum input line, the first isolation valve having a high pressure end positioned toward the second isolation valve and the second isolation valve having a high pressure end positioned toward the first isolation valve; iii) a third valve on a second line between a fourth valve and the main line, the fourth valve in fluid communication with the main line via the second line, the second line in fluid communication with the main line at a point between the tube coil second end and the first isolation valve; iv) a second pressurized steam source in fluid communication with the second line at a point between the third valve and the main line; v) a third pressurized steam source in fluid communication with the fourth valve, vi) a fifth valve in fluid communication with the second line at a point between the fourth valve and the third valve and in fluid communication with a vent; vii) a third line in fluid communication with the main line between the first isolation valve and the second isolation valve and in fluid communication with a sixth valve; viii) a fourth line in fluid communication with the sixth valve and a closed blowdown system header; ix) a seventh valve between the closed blowdown system header and the sixth valve; and x) a fifth pressurized steam source in fluid communication with a eighth valve, the eighth valve in fluid communication with the fourth line between the sixth valve and the seventh valve.

Additional aspects, advantages and embodiments of the disclosure will become apparent to those skilled in the art from the following description of the various embodiments and related drawings.

BRIEF DESCRIPTION OF THE DRAWINGS

The present disclosure is described below with references to the accompanying drawings in which like elements are referenced with like reference numerals, and in which:

FIG. 1 is a schematic diagram illustrating one embodiment of a system for on-line pigging and spalling of coker furnace outlets according to the present disclosure.

DETAILED DESCRIPTION OF THE PREFERRED EMBODIMENTS

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

The following description refers to FIG. 1, which illustrates a system for on-line pigging of coker furnace outlets which can also be used for on-line spalling of those coker furnace outlets. On-line pigging permits a more thorough cleaning of furnace tubes of a delayed coker furnace while maintaining operation of the associated delayed coker drums through input from other furnaces.

The disclosure of FIG. 1 illustrates a single pass. In practice, using the present disclosure, an operator may pig two passes, to decoke two tube passes 103, in one furnace cell simultaneously, and use only one on-line pigging manifold to clear and isolate each of the two passes. On-line pigging of tubes associated with a delayed coker furnace in such a larger system results in less down time and less lost profit opportunity than unit shutdown and off line pigging decoking of the same tubes. The present disclosure provides a system which provides for on-line pigging of those tubes and further provides the flexibility to additionally perform on-line spalling of those tubes. The present disclosure provides a system and method which provides adequate safe hazardous energy isolation of the furnace tube passes to be decoked, by providing double block and purge systems on closed valves. This reduces valve leakage or failure which could result in partial coking of piping and valve components, complete blockage by coke buildup in those components, or even undesirable worker safety events. The present disclosure also permits the utilization of steam to displace the process fluid and cool the furnace coils to avoid abrupt shocks which would otherwise contribute to tube failure. Thus, the present disclosure adequately and safely isolates furnace passes for on-line pigging, while maintaining the flexibility to on-line spall and facilitates a successful on-line pigging of the furnace coils.

System Description

Referring now to FIG. 1, a schematic diagram illustrates one embodiment of a system for on-line pigging decoking and on-line spalling decoking of one or more coker furnace tube coils 103 of one or more coker furnaces 102 according to the present disclosure. A plurality of embodiments of the system of the present disclosure may be applied to a plurality of coker furnace tube coils 103. Where the coker furnace 102 includes a plurality of coiled tubes 103, each connected the main line 108, each of the coiled tubes 103 may be similarly be connected to the pigging unit 104, which includes a launcher and receiver for a pig.

The present disclosure provides a system for on-line pigging of a tube coil 103 of a furnace 102. The coil 103 can be connected to an open process fluid supply 160 or a first pressurized steam supply 148 via a furnace charge line 178, or fully disengaged from both, permitting engagement of the coil 103 at its input to another component. Similarly, the coil 103 is in fluid communication with an input of one or more delayed coking drums 116, 117 though the main line 108, but may be disengaged from the main line 108, permitting engagement of the coil 103 at its output to another component. The one or more delayed coke drums 116, 117 may be in fluid communication with one or more additional cells of the furnace or other furnaces. As can be appreciated, additional drum input lines 170 from other furnaces or other furnace cells of the same furnace 102 may be joined to the main line 108 before input to the one or more coke drums 116, 117. These additional lines may generate pressurization which must be addressed to provide safe operation and prevent coking of the second isolation valve 112 due to leaking of the valve and heating and cooling of the leaked material.

The main line 108, from the coil 103 to the one or more delayed coking drums 116, 117, includes a first isolation valve 110 between the coil 103 and the one or more delayed coking drums 116, 117. A second isolation valve 112 is positioned between the first isolation valve 110 and in the input of the one or more delayed coking drums 116, 117. Both the first isolation valve 110 and the second isolation valve 112 are preferably directional, and therefore each have a high pressure end. The high pressure end of the first isolation valve 110 is positioned toward the second isolation valve 112 while the high pressure end of the second isolation valve 112 is positioned toward the first isolation valve 110. The first isolation valve 110 and the second isolation valve 112 may each be a ball valve, such that the high pressure end is the spring-loaded seat end of the valve, as opposed to the fixed seat end of the valve.

The main line 108, the first isolation valve 110, and the second isolation valve 112 are capable of withstanding the several thermal transients and time at elevated temperature of about 1250° F. during an on-line spalling through these components, and to do so while fully complying with all applicable codes and standards, including Recognized and Generally Accepted Good Engineering Practices. This ensures they remain undamaged and free of coking to facilitate safe operations in subsequent decokings.

A second line 154 communicates with the main line 108 at a point between the coil 103 and the first isolation valve 110 and provides a pathway to a vent 144 when open. The position of this third line 154 between the coil 103 and the first isolation valve 110 provides two valves—the isolation valve 110 and the second isolation valve 112—between the furnace 102 and the one or more delayed coking drums 116, 117, ensuring the safe environment desired. A third valve 124 is provided on the second line 154 between a fourth valve 122 and the main line 108. When closed, the third valve 124 closes the pathway to the vent 144. When the third valve 124 is open, the fourth valve 122 is in fluid communication with the main line 108 via the second line 154. A third pressurized steam source 120 is provided and is in fluid communication with the fourth valve 122, such that opening the fourth valve 122 permits pressurized steam to apply blocking force against the third valve 124 and a fifth valve 146. The fifth valve 146 is in fluid communication with the second line 154 at a point between the fourth valve 122 and the third valve 124 and in fluid communication with a vent 144. A spectacle blind 152 may be included behind the fifth valve 146 for additional safety. A second pressurized steam source 126 is in fluid communication with the second line 154 at a point between the third valve 124 and the main line 108, via a flow controller 128, which limits the flow of steam from the second pressured steam 126 to the second line 154, and via a ninth valve 130, between the flow controller 128 and the second line 154. The flow controller 128 may be a flow orifice and may include a flow indicator accessible to the user. Alternatively, the flow controller 128 may be controlled by a computer based on user selected criteria.

A third line 156 communicates with main line 108 between the first isolation valve 110 and the second isolation valve 112 and, by communicating with a sixth valve 136, provides a pathway to a closed blowdown system header 142. A pressure controller 134 is in fluid communication with the third line 156 and is also in fluid communication with a fourth pressurized steam source 132. The pressure controller 134 may comprise a flow meter and a pressure regulator, where the flow meter is in fluid communication with a flow indicator, and where the pressure regulator is in fluid communication with a pressure indicator. The pressure controller 134, and its components, may be controlled by a computer based on user selected criteria. During the step of process fluid or steam from the furnace tubes to the blow down system, the pressure controller 134 permits maintaining a pressure in the third line 156 higher than that found in the main line 108 between the second isolation valve 112 and the pressure downstream of valve 112 to coke drum. This higher pressure is critical as it prevents oil from other furnace passes input from other furnaces or other furnace cells of the same furnace 102 communicating to the additional drum input lines 170 with the one or more delayed coking drums 116, 117 from flowing backward or upstream through the second isolation valve 112. This provides further safety should the second isolation valve 112 be in less than good condition or if the pressure is sufficiently high to force the ball in the second isolation valve 112 off its fixed seat, by overcoming the spring on the high pressure end. This steam provides a critical operational block at this step. Later, this pressure controller 134 provides blocking steam for double block and higher pressure purge between the second isolation valve 112 and the first isolation valve 110 to provide hazardous energy isolation while the coil 103 is being vented, and thus the fourth pressurized steam source 132 provides operational and blocking steam, as controlled by the pressure regulator 134.

A fourth line 158 is provided which communicates with the sixth valve 136 and further provides the pathway to the closed blowdown system header 142. A seventh valve 140 is positioned between the closed blowdown system header 142 and the sixth valve 136. A fifth pressurized steam source 138 is provided in fluid communication with an eight valve 162, which is in fluid communication with the fourth line 158 between the sixth valve 136 and the seventh valve 140. The seventh valve 140 may be a flow regulating valve, and may be a globe valve. The seventh valve 140 assists in maintaining back pressure provided by the pressure regulator 134 and to maintain above the pressure of the process fluid downstream of the second isolation valve 112 as the furnace coil flow is diverted to the closed blow down system header 142.

The coil 103 may be connected to the main line 108 by an input flanged swing arm, such as a flanged elbow fitting, 106 in fluid communication with the tube coil 103 and to the open process fluid supply 160 by an outlet swing arm 107 in fluid communication with the tube coil 103. Each swing arm 106, 107 may be disengaged from the coking system and attached to a pigging unit 104 to provide a closed loop and pathway for the pig, such that the input swing arm 106 is in fluid communication with an output of a pigging unit 104 and the outlet swing arm 107 is in fluid communication with an input of the pigging unit 104. Once water is introduced from a water source 150 to the pigging unit 104, the pig is driven through the coil 103. This may be repeated as necessary.

Method Description

To adequately and safely isolate furnace passes for on-line pigging, while maintaining the flexibility to on-line spall and facilitating a successful on-line pigging of the furnace coils, the present system moves from normal operation to a steam-out of the furnace passes being decoked to a closed blowdown system, and to depressurize to atmosphere, and on-line pigging, and to a steam-out to blowdown system.

In the method of the present disclosure, pigging a tube coil 103 of one of a plurality of furnaces 102 or cells of a furnace 102 associated with one or more delayed coking drums 116, 117 may be accomplished while maintaining an output from at least the second of the plurality of furnaces or furnace cells to the one or more delayed coking drums 116, 117, while maintaining a positive double block and purge in an associated piping system in each step of the process.

In connection with the present disclosure, the method may be disclosed with reference to structural elements provided on FIG. 1.

In typical coking operation, before use of the system of the present disclosure, the tube coil 103 of a furnace 102 is in fluid communication with an open process fluid supply 160 and in fluid communication with an input of one or more delayed coking drums 116, 117. To prevent the flow of output moving to the vent 144 along a second line 154, located at a point between the coil 103 and a first isolation valve 110, the third valve 124, provided on the second line 154, is closed. This third valve 124, as provided above, is positioned on the second line 154 between a fourth valve 122 and the main line 108. The first isolation valve 110 is provided on the main line 108 between the second isolation valve 112 and the coil 103.

In the typical coking operation, valves and steam sources must be set and provided to ensure no output from the furnace 102 reaches the vent 144. This is accomplished by ensuring a double block and purge setting in that second line 154. A third pressurized steam source 120 supplies pressurized steam to the fourth valve 122, which is in fluid communication with the main line 108 via a second line 154 and which is initially open. A fifth valve 146 is provide in fluid communication with the second line 154 at a point between the fourth valve 122 and the third valve 124 and is in fluid communication with a vent 144. Initially, the fourth valve is closed. At this point, the pressurized steam supplied from the third pressurized steam source 120 to the third valve 124 and the fifth valve 146 may be characterized as blocking purge steam. To further prevent any output in the main line 108 from passing to the vent 144, a spectacle blind 152 may be provided between the fifth valve 146 and the vent 144 and may be closed.

Additionally, pressurized steam is supplied from a second pressurized steam source 126 to the second line 154 between the third valve 124 and the main line 108. A ninth valve 130, initially open, is provided between the second pressurized steam source 126 and second line 154. This second pressurized steam source 126 provides spool purging steam to the second line 154 between the third valve 124 and the main line 108. A flow controller 128 is provided between the second pressurized steam source 126 and the ninth valve 130.

Similarly, valves and steam sources must be set and provided to ensure no output from the furnace 102 reaches the closed blowdown system header 142. This is accomplished by ensuring a double block and purge setting in a third line 156 and a fourth line 158,. The third line 156 is provided in fluid communication with the main line 108 between the first isolation valve 110 and the second isolation valve 112 and in fluid communication with a sixth valve 136, initially closed. A pressure controller 134 is provided in fluid communication with the third line 156 and in fluid communication with a fourth pressurized steam source 132. The pressurized steam exiting the pressure controller 134 to the third line 156 between the main line 108 and the sixth valve 136 is spool purging steam communication with the third line 156 and in fluid communication with a fourth pressurized steam source 132. The fourth line 158 is provided in fluid communication with the sixth valve 136 and the closed blowdown system header 142. A seventh valve 140, initially closed, is provided between the closed blowdown system header 142 and the sixth valve 136. A fifth pressurized steam source 138 is supplied to the fourth line 158 between the sixth valve 136 and the seventh valve 140 by opening an eighth valve 162. The fifth pressurized steam source 138 provides blocking steam purge to the fourth line 158 between the sixth valve 136 and the seventh valve 140.

In the present disclosure, a first step includes terminating a flow of output from the tube coil 103 in a main line 108 to the one or more delayed coking drums 116, 117 and terminating a process fluid supply 160 to the furnace 102, such as by closing a twelfth valve 176 between the process fluid supply 160 to the furnace 102. Termination of the flow of output from the tube coil 103 in the main line 108 to the one or more delayed coking drums 116, 117 may be accomplished by closing the second isolation valve 112. Thus, the process fluid supply 160 to the furnace is terminated and the system emptied of heated process fluid, firstly throughline 108 to the one or more coke drums 116, 117, and then through the closed blowdown system header 142. To provide the desired double block and purge safe operation, this includes closing the twelfth valve 176, and supplying high pressurized steam from a first pressurized steam source 148 to the tube coil 103 of the furnace 102, and closing the second isolation valve 112 and opening the sixth valve 136. Additionally, the seventh valve 140 is opened sufficiently to maintain a pressure on the second isolation valve 112 greater than the pressure on the opposite side of the second isolation valve 112 to prevent process fluid from other passes on the other side of the valve from leaking through as flow is directed to the closed blow down system header 142. The supply of high pressurized steam from the first pressurized steam. source 148 to the tube coil 103 of the furnace 102 continues until all remaining output from the tube coil 103 of the furnace 102 is dispensed to the closed blowdown system header 142. Thus a spool purge is supplied when there is process oil in the main line 108.

Thereafter, the second step provides a steam out to the closed blowdown system header 142 in the desired double block and purge safe operation. This includes introducing high pressurized steam from a first pressurized steam source 148 through the tube coil 103 of the furnace 102 and into the main line 108 and displacing the remaining output first to one or more the coke drums 116, 117, and then, after closing the second isolation valve 112, to a closed blowdown system header 142. At the same time, the method is maintaining a double block and purge for each valve not between the furnace 102 and the closed blowdown system header 142 to isolate a vent 144 by double blocking the fifth valve 146 and the third valve 124, with blocking steam from the third pressurized steam source 120. Pressure is maintained upstream of the second isolation valve 112 higher than the pressure downstream by the steam from pressure controller 134 to prevent leakage of the second isolation valve 112 backward from the direction of the one or more coke drums 116, 117 and other furnace passes associated with the additional drum input line 170. At the same time, the method is maintaining pressure to the closed blowdown system header 142 when the sixth valve 136 is open, with the seventh valve 140 is opened sufficiently to allow flow to the blow down system yet maintaining sufficient pressure on the second isolation valve 112. To ensure the desired double block and purge safe operation, a high pressurized steam from a second pressurized steam source 126 is provided through a flow controller 128 to the main line 108 to keep the second line 154 clear of process fluid upstream of the third valve 124 to avoid coking at all steps when process fluid is in main line 108.

In the third step, the method provides for depressurization of coil 103. Steam is directed through the coil 103 and through the vent 144. This includes terminating the introduction of the high pressurized steam from a first pressurized steam source 148 into the main line 108 and communicating the high pressurized steam from the first pressurized steam source 148 and the tube coil 103. The first isolation valve 110, the sixth valve 136, and the seventh valve 140 are closed and pressurized steam from a fourth pressurized steam supply 132 as controlled by the pressure controller 134 is supplied against the first isolation valve 110 and the second isolation valve 112. After closing the first isolation valve 110 and establishing positive blocking steam from 134, and the high pressurized steam from the second pressurized steam source 126 through a flow controller 128 is closed, then the main line 108 upstream of first isolation valve 110 is then depressurized to a vent 144. This occurs while maintaining a double block and purge for each valve between the furnace 102 and the closed blowdown system header 142 and between the furnace 102 and the one or more delayed coking drums 116, 117, while providing the pressure controller 134 in fluid communication with a fourth pressurized steam source 132 and each valve on the main line 108 between the furnace 102 and the one or more delayed coking drums 116, 117 to maintain blocking steam pressure on the second isolation valve 112 between the pressure controller 134 and the one or more delayed coking drums 116, 117. The third valve 124 and the fifth valve 146 are opened, while the fourth valve 122 is closed. If the spectacle blind 152 was provided and closed, it is now opened. Thus, the steam from the fourth pressurized steam supply 132 as controlled by the pressure controller 134 performs three functions, serving as blocking steam between the first isolation valve 110 and the second isolation valve 112 when those two valves isolate the balance of the system from the furnace 102, providing adequate backpressure to keep process oil from leaking through the second isolation valve 112 during the step of flow to blowdown, and providing a spool purge to keep the third line 156 clear when process fluid is flowing to the one or more coke drums 116, 117. The method remains in this step until the coils are sufficiently cleaned by the steam and depressurized to atmosphere.

With the coil 103 at atmosphere pressure, in step four, the coil 103 is prepared for pigging. Provision of the high pressure cleaning steam is terminated and the coil 103 prepared for removal from main line 108 and the furnace charge line 178. This includes terminating the supply of the high pressurized steam from the first pressurized steam source 148 to vent 144, including closing the eleventh valve 174. Here, the steam from the first pressurized steam source 148 is used to sweep the coil 103. Disconnecting the tube coil 103 of the furnace 102 from the main line 108 and the furnace charge line 178 may be accomplished by unbolting the inlet swing elbow 106 and the outlet swing arm 107. The tube coil 103 of the furnace 102 is then connected to a pigging unit 104, such as by connecting to each flanged swing elbow 106, 107, after the main line 108 reaches atmospheric pressure.

In a fifth step, the coil 103 is pigging decoked. The pig, a round cleaning device, which may have abrasive outer surfaces, is forced through the coil 103, scouring the interior. To do so, a water source 150 is then supplied to the pigging unit 104, driving the pig through a swing elbow 106, 107, through the tube coil 103 of the furnace 102 and to the pigging unit 104 via the other swing elbow 107, 106. This may be repeated as many times as necessary.

In the sixth step, the method provides for reconnecting the tube coil 103 coil of the furnace 102 to the main line 108 and to the first pressurized steam source 148, and supplying steam to the tube coil 103 of the furnace 102 by opening the eleventh valve 174.

In a seventh step, the coil 103 is then prepared for use. This requires supplying steam to the tube coil 103 of the furnace 102 and to the vent 144 to displace air from the coil. This may be accomplished by closing the second line 154 to the vent and establishing the desired double block and purge safe operation. The fifth valve 146 and the third valve 124 are closed and the fourth valve 122 opened to provide a double block and purge using steam from the third pressurized steam supply 120. For safety purposes, the spectacle blind 152, if used, may also be closed. Thus, the vent 144 is isolated. The first isolation valve 110 and the sixth valve 136 are then opened. The opening of the seventh valve 140 is restricted to maintain pressure on the second isolation valve 112 until the tube coil 103 of the furnace reaches at least about 400° F. and not more than about 700° F. and until the main line 108 is dry.

In the eighth step, the method provides for reheating the temperature of the coil 103. The sixth valve 136 and the seventh valve 140 are opened to the closed blowdown system header 142 and steam is flowed to the closed blowdown system header 142 as the temperature of the furnace 102, or the cell of the furnace 102 off-line, is raised until the tube coil 103 of the furnace 102 reaches at least about 400° F. and not more than about 700° F. and until the main line 108 is dry. The method provides for simultaneously maintaining the desired double block and purge for each valve not between the furnace 102 and the closed blowdown system header 142 to isolate a vent 144.

In the ninth step, the method provides, once the dry state is reached, for resuming communication of output to one or more delayed coking drums 116, 117 or for on-line spalling. The method first provides for terminating flow to the closed blowdown system header 142 and obtaining a double block and purge for each valve not between the furnace 102 and the closed blowdown system header 142. The second isolation valve 112 is opened to permit flow to the one or more delayed coking drums 116, 117. The sixth valve 136 and the seventh valve 140 are closed, terminating flow to the closed blowdown system header 142. The ninth valve 130 is opened to provide spool purge steam.

After the ninth step, on-line spalling through the main line 108, the first isolation valve 110, and the second isolation valve 112 may be performed.

The method then provides for resuming decoking operations. This includes resuming communication from the tube coil 103 in a main line 108 to the one or more delayed coking drums 116, 117 and resuming flow of the process fluid supply 160 to the furnace 102 by opening the twelfth valve 176. As the first isolation valve 110 and the second isolation valve 112 are open, the introduction the process fluid supply 160, a feed stock, to the tube coil 103 of the coke furnace 102 generates the output from the coil 103 of the coke furnace 102 which is supplied to the input of the one or more delayed coking drums 116, 117 though the main line 108. The temperature of the tube coil 103 in the furnace 102 is then raised to a standard operating temperature for normal operations, which then resumes.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for on-line pigging in a tube coil for a furnace in a delayed coking system, which comprises:
   terminating a process fluid supply flow to the furnace;
   introducing high pressurized steam from a first pressurized steam source through the tube coil and a main line, and from a second pressurized steam source through a second line connected to the main line for forcing any remaining process fluid in the tube coil and the main line to a closed blowdown system header or a delayed coking drum, the tube coil, the closed blowdown system header and the delayed coking drum in fluid communication with each other;
   isolating a vent, in fluid communication with the second line, from the main line by introducing high pressurized steam from a third pressurized steam source through the second line to maintain a constant pressure against one side of first and second closed valves positioned in fluid communication with the vent between the vent and the main line while introducing the high pressurized steam from the first pressurized steam source and the second pressurized steam source;
   terminating the introduction of the high pressurized steam from the first pressurized steam source, the second pressurized steam source and the third pressurized steam source;
   removing steam from the main line through the vent by opening the first and second closed valves between the vent and the main line;
   isolating a drum input line, in fluid communication with the main line, from a portion of the main line by introducing high pressurized steam from a fourth pressurized steam source through a third line connected to the main line to maintain a constant pressure against one side of third, fourth and fifth valves in fluid communication with the drum input line, wherein two of the third, fourth and fifth valves are positioned on the main line between the drum input line and the portion of the main line, and one of the third, fourth and fifth closed valves is positioned on the third line between the main line and the closed blowdown system header;
   disconnecting the tube coil from the main line and the first pressurized steam source;
   connecting the tube coil to a pigging unit after the main line reaches atmospheric pressure; and
   introducing water from a water source to the pigging unit for driving a pig through the tube coil.

2. The method of claim 1, further comprising:
   supplying steam to the tube coil and to the closed blowdown system header until the tube coil of the furnace reaches at least about 400° F. and not more than about 700° F. and until the main line is dry, while isolating the vent by introducing the third pressurized steam source to block the first and second closed valves in fluid communication with the vent; and
   terminating flow of the steam to the closed blowdown system header and introducing high pressurized steam from a fifth pressurized steam source to block one of the third, fourth and fifth closed valves and a sixth closed valve in fluid communication with the closed blowdown system header; and
   resuming the flow of the process fluid supply to the furnace.

3. The method of claim 1, wherein isolating the vent comprises positioning a flow controller between the third pressurized steam source and the second line.

4. The method of claim 1, wherein terminating the introduction of the high pressurized steam comprises providing a pressure controller in fluid communication with the fourth pressurized steam source.

5. The method of claim 1, wherein introducing high pressurized steam from the fourth pressurized steam source comprises introducing the high pressurized steam at a pressure greater than the pressure of high pressurized steam on an opposite side of one of the third, fourth and fifth closed valves positioned between the third line and the drum input line.

6. The method of claim 2, wherein supplying steam to the tube coil comprises restricting an opening of the sixth closed valve between the fifth pressurized steam source and the closed blowdown system header to maintain pressure on one of the third, fourth and fifth closed valves positioned between the third line and the drum input line.

7. The method of claim 1, wherein the high pressurized steam from the third pressurized steam source to the first and second closed valves provides blocking steam.

8. The method of claim 1, further comprising:
   closing a spectacle blind after terminating the introduction of the high pressurized steam from the first pressurized steam source, the spectacle blind being positioned between one of the first and second closed valves and the vent.

9. The method of claim 1, wherein the second pressurized steam source provides spool purging steam to the second line.

10. The method of claim 4, wherein, the pressurized steam exiting the pressure controller is spool purging steam.

11. The method of claim 1, wherein, the fifth pressurized steam source provides a blocking steam purge to a fourth line between the fifth pressurized steam source and the closed blowdown system header.

12. The method of claim 1, wherein introducing high pressurized steam from the fifth pressurized steam source comprises supplying the high pressurized steam from the first pressurized steam source to an inlet of the tube coil until all output from the tube coil is dispensed to the delayed coking drum or the closed blowdown system header.

13. The method of claim 1, wherein, the high pressurized steam from the fifth pressurized steam source provides blocking steam.

14. The method of claim 1, wherein disconnecting the tube coil comprises:
 disconnecting an inlet swing arm coupled with the tube coil from the process fluid supply and an outlet swing arm coupled with the tube coil from the main line; and
 connecting the inlet swing arm to a swing arm coupled with the pigging unit and the outlet swing arm to another swing arm coupled with the pigging unit.

* * * * *